United States Patent
Boyer et al.

(10) Patent No.: US 6,267,809 B1
(45) Date of Patent: Jul. 31, 2001

(54) DRIVEWAY SEALER USING PHASE STABLE POURABLE PITCH

(75) Inventors: D. Chris Boyer, Huntington, WV (US); Patricia K. Doolin, Ashland, KY (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 0 days.

(21) Appl. No.: 09/442,153

(22) Filed: Nov. 16, 1999

Related U.S. Application Data

(60) Provisional application No. 60/137,350, filed on Jun. 3, 1999.

(51) Int. Cl.$^7$ .............................. B01F 3/08; C08L 95/00; C09D 195/00
(52) U.S. Cl. ........................... 106/277; 106/284; 208/23; 516/38; 516/39; 516/43; 516/45; 516/52
(58) Field of Search .............................. 208/23; 106/284, 106/277; 516/38, 39, 52, 43, 45

(56) References Cited

U.S. PATENT DOCUMENTS

| | | | |
|---|---|---|---|
| 1,198,769 | * 9/1916 | Richardson | 106/277 |
| 2,297,455 | * 9/1942 | Brautigam et al. | 208/23 |
| 2,888,358 | * 5/1959 | Krenkler | 106/277 |
| 3,060,047 | * 10/1962 | Graff et al. | 106/284 X |
| 3,140,248 | 7/1964 | Bell et al. | 208/40 |
| 3,304,192 | * 2/1967 | Barrett | 208/23 X |
| 3,615,802 | * 10/1971 | Betty, Jr. et al. | 208/23 X |
| 3,940,281 | * 2/1976 | Corbett | 208/23 X |
| 4,066,159 | 1/1978 | Romovacek | 196/132 |
| 4,211,576 | * 7/1980 | Yan | 208/23 X |
| 4,243,513 | 1/1981 | Horowitz et al. | 208/44 |
| 4,537,635 | 8/1985 | Bart et al. | 106/277 |
| 5,746,906 | 5/1998 | McHenry et al. | 208/22 |

FOREIGN PATENT DOCUMENTS

| | | | |
|---|---|---|---|
| 421269 | * 12/1934 | (GB) | 106/277 |
| 788160 | * 12/1957 | (GB) | 106/277 |

* cited by examiner

*Primary Examiner*—Richard D. Lovering
(74) *Attorney, Agent, or Firm*—Richard D. Stone; Laurence P. Hobbes

(57) ABSTRACT

A low softening point pitch is disclosed. A high melting point (100° C.+) pitch is blended with an aromatic rich liquid hydrocarbon stream to form a pourable pitch mixture having a softening point of 30–50° C. which can be used as a partial or complete replacement for coal tar pitch used in driveway sealer and other sealer and coating applications. Driveway sealer (an emulsion of clay, water and binder) made with this pitch has enhanced durability. The low softening point pitch, even when blended with coal tar pitch, is phase stable on storage.

8 Claims, No Drawings

DRIVEWAY SEALER USING PHASE STABLE POURABLE PITCH

CROSS REFERENCE TO RELATED APPLICATIONS

This applications claims the benefit under 35 U.S.C. 120 of prior co-pending, provisional application 60/137350, filed on Jun. 3, 1999.

BACKGROUND OF THE INVENTION

I. Field of the Invention

The invention relates to a low softening point petroleum pitch and scaler made from this pitch for asphalt pavement or metal surfaces.

II. Description of the Prior Art

There are two basic types of driveway or pavement sealer—coal tar based and asphalt based. These materials are primarily used to seal driveways and other pavement surfaces, but can also be used to seal or coat metal, wood, or cementitious surfaces, e.g., pipe coatings.

Coal tar is the premier product and has the largest market share. Driveway sealer made from coal tar is an emulsion of water, coal tar pitch, clay and water, perhaps with emulsifier and optional ingredients such as sand. These materials are long lasting, have a pleasing black color, and are resistant to gasoline and kerosene spills, but have an objectionable odor during application and contain aromatic compounds. Asphalt based materials are made from distilled petroleum fractions, typically vacuum tower bottoms or perhaps atmospheric tower bottoms. These heavy hydrocarbon fractions are sometimes oxidized or "blown" to change the asphalt properties. Asphalt based sealers do not smell as much as the coal tar based materials and are able to withstand a wider range of temperatures. The asphalt sealers are not as toxic and in some areas only asphalt-based sealers are sold. Asphalt sealers do not have the black color desired by many users. Asphalt sealers do not last as long, and frequently must be reapplied every year or every two years.

The goal of the present invention is to provide a low softening point pitch product similar to coal tar sealer base with similar physical properties such as viscosity and softening point. This material is intended to be a complete, or at least partial, replacement of coal tar, so that sealer base and driveway sealers with acceptable properties can be made with less, or no, coal tar pitch. With that goal in mind, some of the closest art known is reviewed hereafter. The art review can be arbitrarily grouped into four areas:

A. Coal tar driveway sealer
B. Blends of coal tar pitch/petroleum
C. Control of pitch production
D. Low softening point pitches Coal Tar Driveway Sealer U.S. Pat. No. 4,222,916, Hergenrother, RUBBERIZED COAL TAR PITCH EMULSION, discloses a coal tar based sealer with acrylate emulsion.

U.S. Pat. No. 4,537,635, Bart et al., teaches driveway sealers from oxidized coal tar.

As stated previously, most driveway sealer is either a premium product based on coal tar or a coal tar free, asphalt based product, which lasts for a year. Blends of coal tar and asphalt based products are not sold commercially. An additional concern is that coal tar based driveway sealers comply with the specifications for coal tar based sealers disclosed in ASTM D3320, Emulsified Coal Tar Pitch (Mineral Colloidal Type), and Federal Specification R-P=355e, Pitch, Coal Tar Emulsion (Coating for Bituminous Pavements), which specify use of coal tar pitch. Although coal tar/petroleum pitch blends are not used commercially in driveway sealers, there have been reports of pitch blends for other uses, reviewed next.

Blends of Coal Tar Pitch/Petroleum

Commercial blends of coal tar pitch and a minor amount of petroleum pitch have probably been made. For aluminum anode binder pitch, reviewed in greater length hereafter, it has been common to "extend" the coal tar pitch by blending in up to 10% petroleum pitch, so that the pitch used was a 90:10 blend of coal tar:petroleum pitch. Some uses of petroleum pitch as an extender for driveway sealer may have occurred, but they have not been reported in the literature.

Blends of coal tar with petroleum pitch are known in the art, but not for driveway sealer. This art, reviewed hereafter, is believed to be the closest to the low softening point petroleum pitch of the present invention.

U.S. Pat. No. 5,746,906, McHenry, et. al., May 5, 1998, disclosed a coal tar pitch/petroleum pitch blend and method of making it. A crude coal tar material is selected according to specific properties including QI, specific gravity, water and ash content. A petroleum pitch material is also selected according to its softening point, QI, coking value and sulfur content. The coal tar pitch is distilled to an uncharacteristically high softening point then mixed with a lower softening point petroleum pitch to a desired softening end point. The material retains significant QI and coking value characteristics of pure coal tar pitch particularly for use in Soderberg-type anodes for aluminum smelting as well as electric arc furnace electrodes. PAH emissions, and more specifically B(a)P equivalent emissions, are all reduced by approximately 40%.

The petroleum pitch used in '906 had a softening point of 80° C. nominal. This was mixed with coal tar pitch distilled to have a softening point of 130–175° C.

Control of Pitch Production

Control of coal tar pitch fractionation is described in U.S. Pat. No. 4,066,159.

Control of petroleum pitch fractionation is straightforward distillation.

It is easy to run any pitch fractionation process to produce a product with the desired softening point and this is the norm for most pitches, both coal tar and petroleum.

Low Softening Point Pitch

Some coal tar pitch materials are made with a relatively low softening point. For driveway sealer use, the coal tar pitch will typically have a softening point of around 40° C., as discussed in the driveway sealer art.

Petroleum pitches which are solids at room temperature, and which are not suitable for use as driveway sealer, have been made by producing a high softening point material, e.g., A240, and blending this with cutter stock such as aromatic oil. These blends are generally destined for use as a binder pitch or impregnant, and for these uses a highly aromatic solvent is preferred to increase coking value. Some physical properties of various commercial petroleum pitch products are summarized in the following section.

TABLE 1

Specifications and Typical Properties of Marathon Ashland Petroleum Pitch
CAS Number 68334-31-6

| Analysis | Test Method | A170 Pitch | A240 Pitch | A225 Pitch |
|---|---|---|---|---|
| Specification Points | | | Limits | |
| Softening Point, Mettler ° C. | ASTM D3104 | 79.4–82.6 | 118–124 | 105–110 |
| Softening Point, Ring & Ball ° F. | ASTM D36 | 166–171 | 235–248 | 212–221 |
| Flash, Cleveland Open Cup, ° C. minimum | ASTM D92 | 200 | 270 | 260 |
| Coking Value, Modified Conradson Carbon, wt %, minimum | ASTM D2416 | NA | 49 | 46 |
| Sulfur Content, wt %, maximum | ASTM D1552 or D4294 | NA | 3.0 | 1.5 |
| Typical Properties | | | Values | |
| Specific Gravity, Helium Pycnometer, g/cc, minimum | ASTM D71 | 1.18 | 1.22 | 1.22 |
| Moisture, wt %, maximum | — | — | 0.5 | — |
| Toluene Insolubles, wt %, minimum | ASTM D4072 | — | 2.10 | 2.10 |
| Quinoline Insolubles, wt % maximum | ASTM D 2318 | 0 | 0.5 | 0.5 |

The above pitches, all solids at room temperature, were made from a direct thermal process or blending A240 with an appropriate cutter oil. A pourable pitch product, one suitable for use in driveway sealers or industrial coatings, has been made from blends of A240 and #6 fuel oil. The driveway sealer usually contains a surfactant or other emulsifier, which would be expected to prevent phase incompatibility problems.

Art Summary

This voluminous art could be summarized as follows.

Driveway sealers are made from coal tar pitch (premium products) or asphalt, but not both. Blends of coal tar pitch and petroleum pitch are used for making anodes for aluminum production. Blends of high softening point petroleum pitch with aromatic oils have been made to produce materials which are solids at room temperature. Pourable petroleum pitch products have been made by blending high softening point pitch with fuel oil.

This pourable (pitch+fuel oil) blend can be further blended with coal tar and other conventional ingredients to produce a good driveway sealer for most markets. The sealers made from such pourable blends of petroleum pitch and fuel oil have two areas where further improvement would improve the market for the product. These two areas are durability and phase stability.

Durability refers to the ability of the driveway sealer product to withstand normal traffic—from feet, automobiles, and the other impacts to which road surfaces are subjected. The pure coal tar sealers have excellent durability, and typically last three years on a normal driveway. The blends, made from coal tar pitch and petroleum pitch+fuel oil, have a satisfactory but reduced durability as compared to the pure coal tar product.

Phase stability refers to the ability of the finished product (an emulsion) to stand for a long time without phase separation and to the ability of the sealer base—a blend of petroleum pitch with fuel oil preferably containing significant amounts of low softening point coal tar pitch—to be stable on storage.

The phase stability problem is relatively minor in terms of finished product—most driveway sealers contain emulsifier which helps keep the oil and water phases mixed. There is usually some settling of the clay. Some stirring is required. This is not to say that phase separation is not a problem, just that so much settles out that customers accept as inevitable the need to stir the product before using it, so breaking of the (petroleum pitch+fuel oil) emulsion is not significant.

Phase instability, in sealer base, can be catastrophic. The currently used blends of high softening point petroleum pitch blended with #6 fuel oil can, even when further blended with low softening point coal tar pitch, precipitate a bottom "tar" phase in the base of storage tanks and trucks. This tar phase can break impellers used to produce finished driveway sealer or seriously complicate the manufacturing process.

We discovered a way to prevent phase separation of sealer base made from blends of coal tar and petroleum. Use of aromatic rich oil will greatly reduce or eliminate phase separation of blended sealer base products. We also discovered an unexpected increase in durability of driveway sealer when aromatic rich oil, rather than a more aliphatic fuel oil, was used to dilute the petroleum pitch.

BRIEF SUMMARY OF THE INVENTION

Accordingly, the present invention provides a pourable petroleum pitch comprising a high softening point petroleum pitch having a softening point above 100° C.; an aromatic rich cutter oil having less than 10 wt % material boiling below 300° C. and wherein; and an aromatic content of at least 50 wt %, and wherein; said pitch and said cutter oil are blended to produce a petroleum pitch having a softening point below 45° C.

In another embodiment, the present invention provides a method of making a phase stable petroleum pitch capable of blending with coal tar pitch without inducing phase separation any of the petroleum pitch component comprising melting a petroleum pitch having a softening point above 100° C. and blending with sufficient aromatic rich cutter oil to produce a material having the properties of Table 1.

DETAILED DESCRIPTION

For clarity, and to avoid the confusing terminology used in many patents, several terms will be defined. This "definition" section is intended as an overview, with a more detailed review of material provided later.

Driveway sealer means a driveway or paving sealer comprising:
 water,
 clay,
 emulsifier and
 "sealer base" or "binder".

The sealer base or "binder" is the hydrocarbon portion of the driveway sealer. This bonds with or acts as a "binder" for the pavement or driveway. Sealer base of the prior art was either based on coal tar pitch for coal tar based driveway sealers or asphalt obtained by distillation for prior art asphalt driveway sealers.

Sealer base or "binder" of the invention comprises a blend of:
 high softening point petroleum pitch which is a solid at room temperature and
 an aromatic rich cutback oil.

Driveway sealers of the invention, and the sealer base material from which the driveway sealer is made, may be blends of coal tar pitch and petroleum pitch. Pitch is defined below.

Pitch could generically be defined as a heavy thermal tar resulting from thermal polymerization of lighter hydrocarbon materials. Coal tar pitch is the product of thermal or destructive distillation of coal. Petroleum pitch is the thermal polymerization product of thermal processing of relatively light hydrocarbon streams, such as slurry oil or cycle oil from an FCC unit or the like. Wood tar pitch, never used in driveway sealers, has been made for millennia by "cooking" pine oil or the liquid recovered during charcoal manufacture. All these materials, whether derived from coal tar, petroleum or wood, are "pitch" for the purposes of the present invention.

Petroleum pitch is a preferred ingredient. For use in areas which restrict use of coal tar pitch for driveway sealer, petroleum pitch may be the only pitch component present in the sealer base and driveway sealer. In many states, blends of petroleum pitch and coal tar pitch may be used and such blends can be used to create high performance driveway sealers.

The cutback oil must be an aromatic rich stream, i.e., one with at least 50 wt % aromatics. Preferred streams are aromatic extracts, cycle oil and slurry oil from FCC columns, and some coker gas oils. Preferably the aromatic rich oil has at least 70 or 80 wt % aromatics or even 90 wt % or more.

The petroleum pitch is produced with a softening point much above that which could be tolerated in the sealer base and diluted with a controlled amount of aromatic rich cutback oil.

Emulsifier is a surfactant detergent or dispersing agent added to help mix the oil of the scaler base with water to form an emulsion. Use of emulsifiers is well known.

Clay is an essential and well known part of the driveway sealer. The sealer may contain sand, carbon black or other colorants, plastics, thickeners, anti-stripping agents and the like.

Organic anti-strip agents can be used to promote coating and adhesion, increase the resistance of the sealer film to stripping from the clay or sand particles by the action of water. Anti-stripping additives are selected from a group of amines and amines salt. T. J. Gavin and F. A. Hughes, U.S. Pat. No. 3,347,690, Oct. 17, 1967, assigned to Atlas Chemical Industries Inc., describe the use and chemistry. Sufficient anti-stripping additive is generally used to give good adhesiveness to the mixture. Generally upwards of 0.1% by weight of the sealer is sufficient to fulfill this requirement. A suitable range of additive found to be both efficient and economical for the mixtures of the process is 0.5% to 1.5% by weight of the sealer Excellent driveway sealers can be made with "off the shelf" ingredients, which are staple articles of commerce, and our pourable, phase stable petroleum pitch.

More details will now be provided about each component.

Each part of the sealer base or "binder" of the invention will now be reviewed in depth, namely the pourable petroleum pitch and the optional coal tar pitch material and other ingredients added to sealer base or needed to make driveway sealers. After this review of the individual components, preferred ratios or blends of various materials will be reviewed, including a brief discussion of some conventional additives for driveway sealer (clay, sand, colorants, and the like) and other sealer applications. This is followed by a review of precautions that need to be taken to get sealer base to the driveway sealer manufacturing facility without phase separation.

Pitch

Petroleum pitch, such as Marathon Ashland Petroleum's A240 material, is a preferred component. Coal tar is a preferred, but optional, ingredient. Pitch from wood may be used, if available.

Coal tar pitches, when desired, may be made using the method and apparatus of U.S. Pat. No. 4,066,159, METHOD AND APPARATUS FOR THE CONTROL OF PITCH STILL OPERATION. An oxidized coal tar distillation cut may also be used, as disclosed in U.S. Pat. No. 4,537,635. Coal tar pitch is a beneficial but optional component.

Petroleum pitches may be made using the method disclosed in U.S. Pat. Nos. 4,671,848, 4,243,513, or 3,140,248.

Eminently suitable for use herein are the petroleum pitch products available from Marathon Ashland Petroleum's A240 pitch with an aromatic rich cutter stock. The material should be blended to have a softening point of 35–45° C., and preferably has a softening point of 40° C.

Aromatic Cutback Oil

This is an essential ingredient if the goal is to make sealer base or driveway sealer (and other sealers) starting with A240 pitch. There are a variety of refinery liquid hydrocarbon streams which can be used, though not necessarily with the same results. These include:

FCC light cycle oil

FCC slurry oil, or clarified slurry oil

Coker naphtha

Coker gas oil

Aromatic extracts

A flash point specification or phase compatibility limit usually sets the minimum boiling point, or front-end volatility, of such streams.

In general, heavy liquid hydrocarbon streams are better "co-solvents", or cutback oils, than light liquid hydrocarbon streams.

In general, highly aromatic streams are better solvents for the condensed, multi-ringed aromatic structures which make up both the pitch and asphaltic fractions.

Such materials are well known and widely sold and further discussion thereof is not necessary as one could go to a refinery and purchase these streams.

Critical cutback oil properties are somewhat dictated by the initial softening point of the pitch, but in general for the examples specified are:

Cleveland Open Cup Flash (COC) of greater than 270–400° F.

Viscosity, Fural @ 122° F. of greater than 20 seconds

Cutback oils are preferentially aromatic in nature to provide the best solvency to the system.

Properties of the aromatic solvent are:

Broadly

Aromatic Content: 25–100%

Aniline Point: 50–120° F.

2–5 Ring Aromatics: 50–100%

Preferred

Aromatic Content: 70–100%

Aniline Point: 70–120° F.

2–5 Ring Aromatics: 70–100%

Coal Tar/Petroleum Pitch Ratios

The process and sealer of the present invention will usually include some coal tar pitch or a mixture of coal tar pitch and petroleum pitch, when the odor or toxicity of the coal tar pitch can be tolerated.

The problem of phase instability seems to be worst when a blend of coal tar pitch/pourable petroleum pitch is used, and the blend contains only minor amounts of pourable petroleum pitch.

When large amounts of coal tar can be tolerated, the blend is primarily coal tar pitch with a minor amount, less than 50 wt %, of pourable petroleum pitch. A pitch blend of 5–50 wt % petroleum pitch and 95–50 wt % coal tar pitch gives good results. Other blends may be 10–35 wt % pourable petroleum pitch and 90–65 wt % coal tar pitch.

Binder (Sealer Base) Properties

PROPERTIES

| Test | Property | Specification |
|---|---|---|
| ASTM D 139 | Float Test @ 50° C., sec | 170–280 |
| ASTM D20 | Distillation wt % | |
| | 0–170° C. | 0.0 |
| | 0–270° C. | 1.2 max |
| | 0–300° C. | 3.5 max |
| ASTM D36 | Softening Point of Residue @ 300° C. R&B, ° C. | 45–55 |
| ASTM D92 | Flash Point, COC, ° C. | 167 min |

Many of these properties are specified for safety (flash point) or ability to work with these materials in the field (viscosity).

Additives

There are some additional components which are preferred for sealer base and also for generalized sealing, such as coating metal surfaces. These materials are commercially available and, per se, form no part of the present invention.

The filler can be any suitable filler composition and can be selected from the group consisting of clay, Gilsonite, and tar sands. Filler is present in the scaling compositions of the present invention in amounts ranging from 30 to 40 wt %, preferably 30 to 35 wt %.

Suitable emulsifying agents can include aqueous polyvinylalcohol, aqueous amines, aqueous compounded amines such as those available from Akzo Chemicals and sold under the trade name Redicote (i.e., Recicote E-9) or those available from B. F. Goodrich Chemical Co. and sold under the trade name Carbopol; and aqueous solutions of aliphatic fatty acids and caustic (usually sodium hydroxide) and dispersing agents such as ACT 1 from Blendco Inc. Exemplary amines are commercially available primary aliphatic amines, trimethylaminediamines such as N-alkyl trimethylenediamine, polyethoxylated aliphatic amines and diamines ($C_8$ to $C_{18}$), amine acetate salts derived from primary, secondary or tertiary amines with the alkyl group ranging from $C_8$ to $C_{18}$, high molecular weight aliphatic primary, secondary or tertiary amines ($C_8$ to $C_{18}$), and quaternary ammonium salts containing one or two alkyl groups ranging from $C_8$ to $C_{18}$. Compounded amines are commercially available and are generally complexed or otherwise stabilized compositions with preserved amine functionality. Ionic aliphatic fatty acids include nonionic polyethoxylated fatty acid compositions available under the trade name Ethofat and other commercially available fatty acid, tall oil and tallow or animal fat ($C_{16}$ to $C_{18}$) based cationic emulsifiers. Emulsifiers are present in the sealing compositions in amounts ranging from 1 to 10 wt %, preferably from 2 to 5 wt %, say about 1 to 3 wt % based on 100%.

The appearance-enhancing additive can be selected from the group consisting of tallow, carbon black, dyes, and pigments.

Appearance-enhancing additive is present in the asphalt sealing compositions in amounts ranging from 0.5 to 10 wt %, preferably from 1 to 5 wt %, based on 100%.

Sealers for Metal Surfaces/Waterproofing

In addition to use as a driveway sealer, the sealer base may be used as is or modified to permit use for pipe coating or the like. The material may also be used as a waterproofing agent for wood, metal, and cementitious materials.

In some instances, coating materials are used in neat form to paint or spray on wood metal or cementitious materials. Water or clay may be optional.

EXAMPLES

Example 1

A sealer base is prepared by blending 47 wt % A240 petroleum pitch with 53% aromatic extract having the properties shown in Table 1 to form a pourable petroleum pitch with a softening point of about 40° C. by Mettler. Pourable pitch properties are presented in Table 2. The properties of the sealer base or binder are shown in Table 3.

TABLE 1

| Aromatic Cutter Oil Properties | |
|---|---|
| Specific Gravity @ 60° F. | 0.99–1.01 |
| API Gravity @ 60° F. | 8–10 |
| Viscosity @ 212° F., cst | 5–20 |
| COC Flash Point, ° F. | 385–500 |
| % Aromatics | 50–85 |
| % Polars | 2–5 |

TABLE 2

| Property | |
|---|---|
| Float Test @ 50° C., sec | 242 sec |
| Distillation, wt % | |
| 0–170° C. | 0 |
| 0–270° C. | 0.5 |
| 0–300° C. | 1.1 |
| Softening Point of Residue @ 300° C., R&B, ° C. | 46 |
| COC Flash, ° C. | 265 |

TABLE 3

| Properties of Sealer Binder | |
|---|---|
| Mettler Softening Point, ° C. | 42.3 |
| Flash Point, ° C. | 260 |
| Float @ 50° C., seconds | 286 |
| D-20 Distillation, wt % | |
| 0–170° C. | 0 |
| 0–270° C. | 0.7 |
| 0–300° C. | 1.3 |
| Softening Point of Residue @ 300° C., R&B, ° C. | 48 |

Pavement sealer prepared with 28.3% binder+coal tar binder, 0.3% BlendCo ACT I emulsifier, 55.4% clay slurry, and 16% water was tested for accelerated weathering. Results showed that aromatic solvent showed improved water and wear resistance compared to a similar blend made with aliphatic solvent.

| Scrub Resistance, brass brush, 750 g glass plate | | |
|---|---|---|
| | Unconditioned 72-hour cure | Conditioned 72-hour cure + water soak |
| Aromatic Extract Binder | >30,000 | 502 |
| Aliphatic Solvent binder | 11,947 | 400 |

Discussion

The petroleum pitch of the invention is compatible with, and may be a partial or complete replacement for, the coal tar based products currently used to make finished driveway sealer and other sealers. Thus no change is needed in manufacturing or storage procedures.

The use of petroleum pitch permits the valuable and dwindling supply of coal tar pitch to be extended or diverted to other uses. The pourable petroleum pitch of the invention makes finished driveway sealer product with superior scrub resistance, as compared to pourable petroleum pitch made with less aromatic cutback oils such as #6 fuel oil. In addition, the pourable petroleum pitch of the invention is resistant to phase separation on standing, as compared to pourable petroleum pitch made using #6 fuel oil.

This invention teaches that aromatic oils such as lube plant extract, coal tar extracts, or aromatic streams produced from thermal or catalytic petroleum processes can be used to increase compatibility between petroleum and coal tar materials. Pavement sealer emulsions produced from base oils containing these aromatic solvents have improved stability and wearability as determined by accelerated weathering and modified scrub testing (ASTM D-4799). Enhanced compatibility of the aromatic solvent leads to more uniform blending and reduced susceptibility to phase separation, which leads to improved storage life. Aromatic oils containing petroleum-based sealers have improved water resistance, strength of adhesion, and bonding to substrate.

Precautions

Even though the sealer base of the invention is very phase stable, it should not be transported in asphalt tank trucks nor stored in vessels contaminated with asphalt. The asphalt may promote phase separation.

Modifications

Specific compositions, methods, or embodiments discussed are intended to be only illustrative of the invention disclosed by this specification. Variations on these compositions, methods, or embodiments are readily apparent to a person of skill in the art based upon the teachings of this specification and are, therefore, intended to be included as part of the inventions disclosed herein.

Reference to documents made in the specification is intended to result in such patents or literature being expressly incorporated herein by reference, including any patents or other literature references cited within such documents.

We claim:

1. A method of increasing the wear resistance of driveway sealers containing water, clay, emulsifier and a petroleum pitch component with a softening point below 50° C. comprising taking a petroleum pitch with a softening point above 100° C. and mixing it with an aromatic rich cutback oil containing at least 60 wt % aromatics to produce a pourable pitch component with a softening point below 50° C., and using said pourable pitch with conventional components of water, clay and emulsifier to produce driveway sealer having improved wear resistance as compared to like driveway sealer prepared without said aromatic rich cutback oil.

2. The method of claim 1 wherein the aromatic rich oil is selected from the group consisting of aromatic extract, FCC cycle oil and FCC slurry oil.

3. The method of claim 1 wherein the aromatic rich oil has a COC Flash Point, ° F., of 385–500, and 50–85 wt % total aromatics.

4. A driveway sealer containing water, clay, emulsifier and a petroleum pitch component having a softening point below 50° C., said petroleum pitch component comprising a blend of:

petroleum pitch having a softening point above 100° C. and aromatic rich cutback oil containing at least 50 wt % aromatics, in an amount sufficient to reduce the softening point of said petroleum pitch component below 50° C., and wherein said driveway sealer exhibits an increase in wear resistance of at least 50% compared to a like driveway sealer product made from a petroleum pitch component comprising a blend of a petroleum pitch having a softening point above 100° C. and #6 fuel oil or other low aromatic cutback oil with less than 50 wt % aromatics.

5. The driveway sealer of claim 4 wherein said cutback oil contains at least 60 wt % aromatics.

6. The driveway sealer of claim 4 wherein said cutback oil contains at least 80 wt % aromatics.

7. The driveway sealer of claim 4 wherein said cutback oil contains at least 90 wt % aromatics.

8. The driveway sealer of claim 4 wherein said petroleum pitch having a softening point above 100° C. has a softening point of 105–124° C.

* * * * *